United States Patent
Tzidon et al.

(10) Patent No.: US 6,191,812 B1
(45) Date of Patent: Feb. 20, 2001

(54) METHOD OF PROVIDING BACKGROUND PATTERNS FOR CAMERA TRACKING

(75) Inventors: Dekel Tzidon, Ramat Hagolan; Aviv Tzidon, Azur, both of (IL)

(73) Assignee: RT-SET Ltd. (IL)

( * ) Notice: Under 35 U.S.C. 154(b), the term of this patent shall be extended for 0 days.

(21) Appl. No.: 08/831,396

(22) Filed: Apr. 1, 1997

(51) Int. Cl.$^7$ .................................................. H04N 9/75
(52) U.S. Cl. ...................... 348/140; 348/587; 348/586; 348/135; 348/136; 348/137; 348/142; 348/169
(58) Field of Search .................................. 348/587, 592, 348/586, 581, 699–703, 25, 135, 169, 136, 137, 140, 142, 155, 141, 145, 147, 590, 593, 596, 600, 601; H04N 9/75

(56) References Cited

U.S. PATENT DOCUMENTS

| | | | |
|---|---|---|---|
| 2,651,233 | * 9/1953 | Tondreau et al. | 396/334 |
| 2,753,395 | * 7/1956 | Lawrence | 348/586 |
| 2,870,672 | * 1/1959 | Gate et al. | 353/28 |
| 2,886,636 | * 5/1959 | Grace | 348/586 |
| 2,969,428 | * 1/1961 | Wittlig | 348/586 |
| 4,393,394 | * 7/1983 | McCoy | 348/587 |
| 4,394,680 | * 7/1983 | Watanabe | 348/587 |
| 4,412,121 | * 10/1983 | Kremers et al. | 219/124.34 |
| 4,621,292 | * 11/1986 | Hirao et al. | 348/348 |
| 4,623,237 | * 11/1986 | Kaneda et al. | 396/96 |
| 4,771,307 | * 9/1988 | Kuno et al. | 396/98 |
| 4,965,840 | * 10/1990 | Subbarao | 382/106 |
| 5,117,283 | * 5/1992 | Kroos et al. | 348/564 |
| 5,223,891 | * 6/1993 | Fierstein et al. | 355/77 |
| 5,231,443 | * 7/1993 | Subbarao | 396/93 |
| 5,434,617 | * 7/1995 | Bianchi | 348/170 |
| 5,502,482 | * 3/1996 | Graham | 348/140 |
| 5,694,203 | * 12/1997 | Ogawa | 356/5.04 |
| 5,696,892 | * 12/1997 | Redmann et al. | 345/425 |
| 5,754,225 | * 5/1998 | Naganuma | 348/155 |
| 5,764,291 | * 6/1998 | Fullam | 348/362 |

* cited by examiner

*Primary Examiner*—John K. Peng
*Assistant Examiner*—Jean W. Désir

(57) ABSTRACT

An improved method of tracking a camera in dynamic chroma-keying of the type in which a foreground object is photographed against a multicolored chroma-key screen. The multicolor patterns are created by projection on a monochrome screen, for example by projecting light through a mask on a screen colored with the chroma-key color. The projection of multiple patterns can emulate the use of a single pattern having multiple levels of detail, and can enable lateral tracking of the camera. Sequentially projecting known transformations (for example, rotations) of a pattern adds an extra degree of freedom which further enhances the accuracy of the method.

35 Claims, 2 Drawing Sheets

METHOD OF PROVIDING BACKGROUND PATTERNS FOR CAMERA TRACKING

FIELD AND BACKGROUND OF THE INVENTION

The present invention relates to video compositing and, more particularly, to a method for providing a background pattern so that the position and orientation of a moving camera can be determined in real time for the realistic compositing of images of a foreground object with a virtual background.

The technique of "chroma-key" compositing has long been used in video production to combine images of a foreground object with a virtual background stored in a digital data base. In this technique, the foreground object is photographed against a background of a "chroma-key" color, typically a particular shade of blue. In the digital images thus captured, all the pixels colored with the chroma-key color are replaced with pixels derived from the virtual background. In order for the background pixels to be rendered in a way that provides a realistic composite image, the position and orientation of the camera must be known.

Several method are known in the art for determining the position and orientation of the camera. These methods can be classified in two categories. In methods of the first category, the position and orientation of the camera are tracked explicitly. In these methods, the camera must be provided with special tracking devices that are rigidly attached thereto. In some of the methods of the first category, the tracking devices are encoders, and lateral movement is tracked by encoders that are in physical contact with the floor of the studio. Another example of the methods of the first category, a magnetic tracker system, is taught by Loftus et al., in PCT application no. US96/04846. Loftus et al.'s special tracking device is a magnetic tracker receiver rigidly attached to the camera. In the methods of the other category, the position and orientation of the camera are inferred from the captured images. For example, Graham, in U.S. Pat. No. 5,502,482, which is incorporated by reference for all purposes as if fully set forth herein, teaches the use of a chroma-key background of two or more shades of blue in a predetermined pattern, for example a checkerboard pattern. The position and orientation of the camera are inferred from the locations of features of the pattern on the captured images.

Methods such as Graham's have the advantage of allowing the use of conventional video cameras, without special tracking equipment. This is particularly convenient for video compositing with hand-held cameras, to avoid the necessity of contacting lateral motion encoders with the floor of the studio, or to avoid the extra bulk and weight of tracking equipment such as that of Loftus et al. Nevertheless, these methods have limitations of their own. One limitation is that the pattern is fixed, in both level of detail and location. If the camera zooms in too closely on the foreground object, there may be too few features in the portion of the image occupying the camera's field of view for the location and orientation of the camera to be determined accurately. Conversely, if the camera is too far from the background pattern, the pattern features may be sufficiently crowded to make it difficult to distinguish between a panning motion of the camera and a lateral translation. In principle, the pattern can be provided with multiple levels of detail, to preserve tracking resolution at all required distances; but this adds to the complexity of the pattern. Similarly, if the foreground object is a live actor who moves laterally with respect to the pattern, and the camera follows the actor, the actor may move so far laterally that not enough of the pattern is left in the camera's field of view to allow the camera's location and orientation to be determined accuracy. A second limitation is that the multiplication of chroma-key colors has been found to degrade the realism of the composite image. The narrower the spectral band of the pixels that are replaced with virtual background pixels, the more realistic the resulting composite image. The loss of realism associated with the use of a multi-shade chroma-key background persists even while the camera is in a fixed position and only one chroma-key color would suffice. A third limitation is that the pattern is fixed in place in the studio, typically being painted on a wall or a fixed partition. This limits the flexibility of the method and precludes its use, for example, in remote locations.

There is thus a widely recognized need for, and it would be highly advantageous to have, a method for providing an image for dynamic chroma-key compositing that is free of the limitations of the methods known in the art.

SUMMARY OF THE INVENTION

According to the present invention there is provided an improved video production method of the type in which a plurality of images of an object in a foreground volume are captured successively by a camera and superposed on a virtual background, the position and orientation of the camera being determined using a first pattern featuring a first scale length and located at least partially beyond the object with respect to the camera, the improvement including the steps of: (a) positioning a screen at least partially beyond the object with respect to the camera; and (b) projecting the first pattern onto the screen.

Simply stated, according to the present invention, the pattern is projected on a screen behind the foreground object. By "screen" is meant herein any suitable flat or curved surface on which the pattern may be projected, although this surface preferably is flat. As is noted below, the screen may be either opaque or transparent. The screen and the projector may be easily configured to be portable, enabling the method to be used in remote locations. In one preferred embodiment, the two colors of the pattern are two shades of a base color, with the screen being colored with the base color and the pattern being provided by projecting white light on the screen through a mask, the shadow of the mask thus creating an area on the screen characterized by a darker shade of the base color than the part of the screen that is illuminated by the white light. If the camera is stationary for a prolonged period of time, or if a scene is shot in which a hand-held camera is not needed, so that a camera equipped with one of the special explicit tracking devices described above may be used, or if a scene is shot in which the camera need not move at all, the projector is simply turned off. The color of the screen then is used as a single chroma-key color, preserving the enhanced realism of the composite image that is provided by the use of only one chroma-key color.

Multiple projectors are used to project multiple patterns on the screen. In this way, a pattern having multiple levels of detail is emulated. For example, if the camera moves so close to the screen that the level of detail of the first pattern is lost, a second pattern having a higher level of detail is superposed on the first pattern. Similarly, if the foreground object moves laterally, a second pattern is projected to the side of the first pattern, to provide continuous lateral coverage.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method of providing background patterns which can be used to determine the position and orientation of a mobile camera during chroma-key compositing.

The principles and operation of camera tracking according to the present invention may be better understood with reference to the drawings and the accompanying description.

Figure 1:
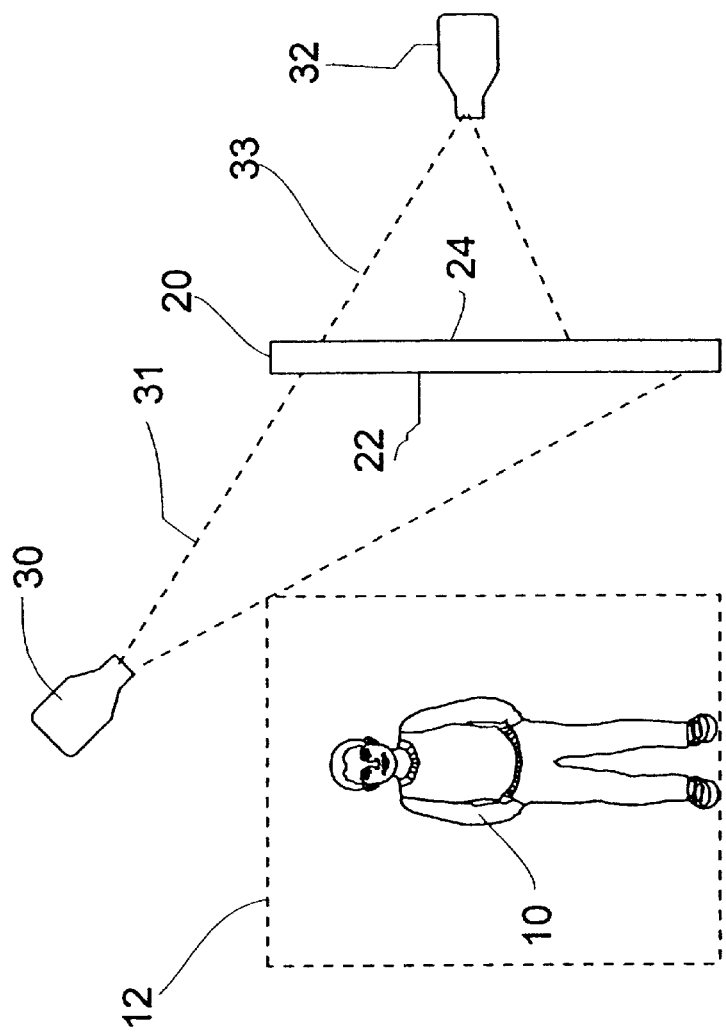
FIG. 1 is a schematic partial depiction of a video studio configured according to the present invention.
Figure 1:
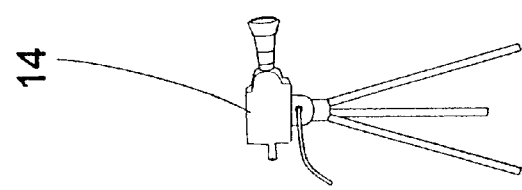

Referring now to the drawings, FIG. 1 is a schematic partial illustration of a video studio configured according to the present invention. A camera 14 photographs an object 10 against the background of a screen 20. Object 10 is free to move within a foreground volume symbolized by dashed rectangle 12. Two projectors 30 and 32 are shown, each configured to project a pattern onto screen 20. Either but not both projectors 30 and 32 are used, each with a particular type of screen 20. If projector 30 is used, to project a pattern onto front surface 22 of screen 20 and obliquely relative to foreground volume 12, then screen 20 is opaque. If projector 32 is used, to project a pattern onto rear surface 24 of screen 20, then screen 20 is transparent, so that the pattern projected onto rear surface 24 is visible on the other side of screen 20. Note that light 31 that is projected on to front surface 22 must be projected obliquely relative to foreground volume 12 to avoid projecting light onto object 10. Thus, if screen 20 is vertical, as shown in FIG. 1, back-projecting from projector 32 has the advantage that it is easier to obtain uniform illumination on screen 20 using light 33 that is projected substantially perpendicular to screen 20 than it is to obtain uniform illumination using obliquely projected light 31.

The pattern projected onto screen 20 is a geometric pattern chosen to facilitate the tracking of camera 14, i.e., the real time determination of the position and orientation of camera 14, from the images of the pattern behind object 10 as captured by camera 14. For example, the pattern may be a checkerboard, as described in U.S. Pat. No. 5,502,482 cited above. More generally, the pattern is any pattern that enables the position and orientation of the camera to be inferred from the captured images of the pattern. For example, the pattern may be a non-uniform checkerboard, i.e., a grid of two mutually perpendicular sets of parallel lines in which the lines of each set are spaced non-uniformly. The computer (not shown) that does the actual compositing is provided with software to enable it to infer the position and orientation of camera 14, so that the background pixels in the images captured by camera 10 can be replaced realistically by virtual background pixels. For increased accuracy, at the start of a video session, the process is calibrated by providing the computer with initial values of the positional and orientational coordinates of camera 14. The first image captured by the camera then serves as a reference image, as described in the above-referenced U.S. Pat. No. 5,502,482.

Figure 2:
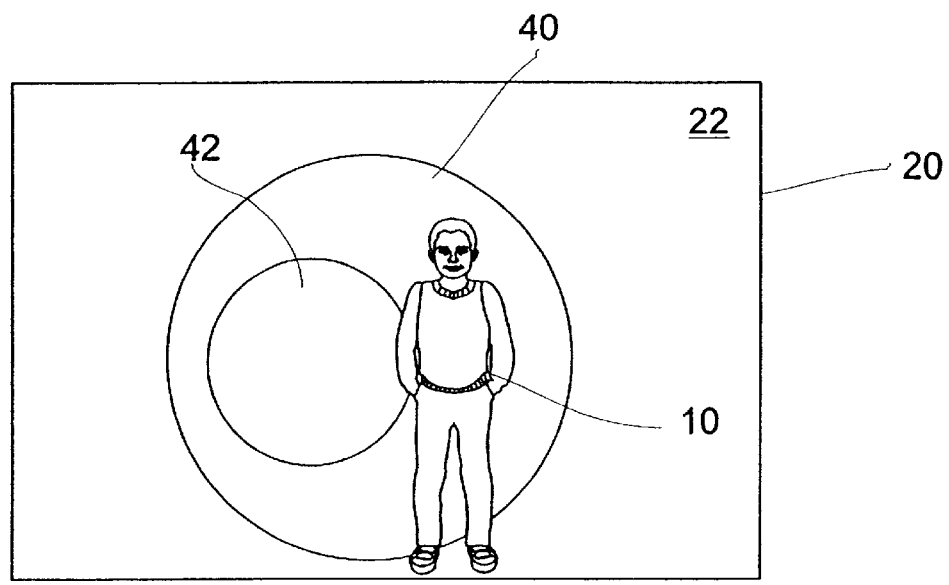
FIG. 2 illustrates the use of multiple projected patterns to emulate a single pattern having multiple levels of detail.

In general, each such pattern is characterized by a scale length. For example, in a non-uniform checkerboard, the scale length is the average separation of two adjacent parallel lines. As noted above, the scale length of a pattern determines the range of distances between camera 14 and screen 20 over which that pattern can be used to track camera 14 accurately. FIG. 2 is a frontal schematic illustration showing how multiple projected patterns, characterized by two different scale lengths, are used to compensate for excursions of camera 14 outside this range of distances. In FIG. 2, the patterns are represented by circles 40 and 42. This representation is symbolic: a real pattern would have a suitably complicated geometry, such as the checkerboard described above, within the area of the circle. Initially, pattern 40 is projected onto screen 20 to enable the tracking of camera 14. If camera 14 is about to move so close to object 10 that pattern 40 has an insufficient level of detail to enable accurate tracking of camera 14, then a second pattern 42, having a scale length shorter than the scale length of pattern 40, is projected onto screen 20. Typically, the scale length of pattern 42 is half the scale length of pattern 40, allowing camera 14 to approach within half the distance to screen 20 that would be allowed if only pattern 40 were used. Preferably, patterns 40 and 42 are projected simultaneously onto screen 22 during the capture of at least one image by camera 14. In this way, the inferred position of camera 14, based on pattern 40 at the closest allowed distance of approach of camera 14 to screen 20 based on pattern 40, is used to calibrate the first image including pattern 42 as a new reference image.

Conversely, if camera 14 is about to withdraw so far from screen 20 that the scale length of pattern 40 is too short to allow accurate tracking of camera 14, then a pattern with a longer scale length, typically twice the scale length of pattern 40, is projected onto screen 20 to allow camera 14 to withdraw at least twice as far from screen 20 as would have been allowed using only pattern 40. This set of patterns, including patterns 40 and 42 and other patterns whose scale lengths are the scale length of pattern 40 multiplied or divided by powers of two, thus serves as a nested set of self-similar patterns, enabling camera 14 to be positioned over a much wider range of distances from screen 20 than is possible under the prior art methods.

Figure 3:
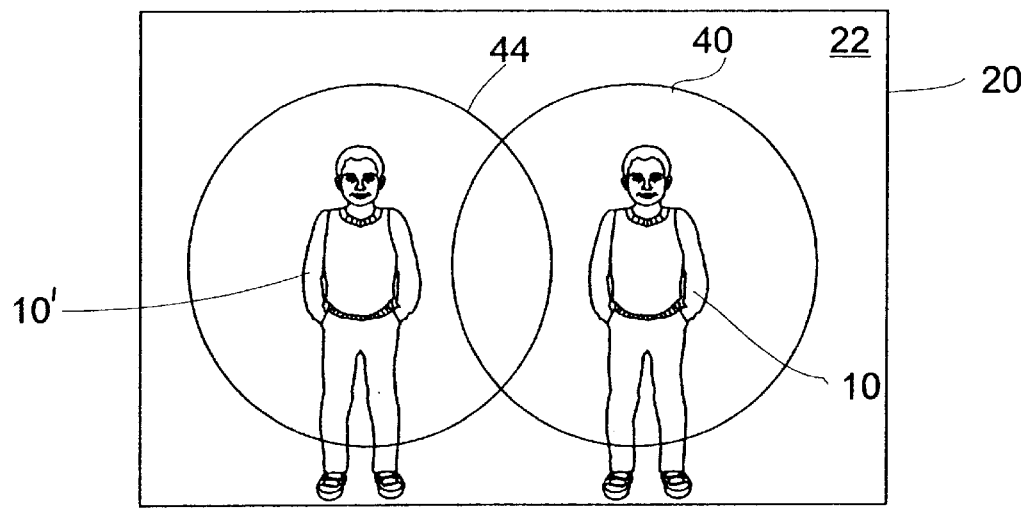
FIG. 3 illustrates the use of multiple projected patterns to track a camera as the camera follows a laterally translating object.

FIG. 3 is a frontal schematic illustration showing how multiple projected patterns are used to enable camera 14 to follow object 10 as object 10 moves laterally with respect to screen 20. As in FIG. 2, the patterns of FIG. 3 are represented by circles 40 and 44. Initially, object 10 is in front of pattern 40, as seen from camera 14. If object 10 moves to the left, to the position of object 10', then not enough of pattern 40 is in the field of view of camera 14 to enable camera 14 to be tracked accurately. Before object 10 reaches the position of object 10', a second pattern 44 is projected onto screen 20. Pattern 44 is displaced far enough laterally from pattern 40 to allow the accurate tracking of camera 14 when camera 14 is pointed at object 10'. As before, both patterns 40 and 44 are projected simultaneously onto screen 22 during the capture of at least one image by camera 14, to allow the first image of pattern 44 to be used as a reference image.

As noted above, if screen 22 is opaque, then preferably two different shades of the same base color are used as chroma-key colors, and front surface 22 is colored with the base color. The pattern (for example, pattern 40) is created on surface 22 by projecting the image of a mask onto front surface 22: the shadowed areas then are the portion of the pattern that is colored with a darker shade of the base color, and the rest of the pattern retains the lighter shade of the base color. The light used to project the image of the mask may be white, or may be the color of front surface 22.

If the projected pattern is altered dynamically under computer control, then another degree of freedom is provided to enhance the accuracy of the tracking of camera 14. This can be done, for example, using one of the projectors manufactured by BARCO Projection Systems of Kuurne, Belgium. Specifically, the patterns projected onto screen 20 subsequent to the first pattern are transformed replicas of the first pattern. For example, a subsequent pattern may be a replica of the first pattern translated by a known amount, a replica of the first pattern dilated or contracted by a known amount, a replica of the first pattern subjected to a known affine transformation, or a replica of the first pattern rotated by a known amount. Preferably, the patterns are projected sequentially in coordination with image capture by camera 14, with each transformed replica projected onto screen 20 during the entire capture by camera 14 of one or more images of object 10 against the background of the pattern, so that the pattern is stable on the captured image. The extra degree of freedom provided by this dynamic alteration of the pattern compensates to a certain extent for loss of resolution due to camera 14 being too close to screen 20 or too far from screen 20 to be tracked accurately relative to a static pattern of a given level of detail. For example, suppose the pattern rotates at a known uniform angular velocity. The changes in the positions of pattern features from one captured image to the next are functions, not only of the positional and orientational coordinates of camera 14, but also of the radial distances of those features from the center of rotation on screen 20. This provides information equivalent to the provision of a second pattern having a shorter scale length than the first pattern, so that a rotating pattern can be used to track camera 14 at closer distances from screen 20 than a static pattern.

If the transformation applied to the pattern is sufficiently simple, for example a rotation or a periodically oscillating translation, then the transformation may be effected by mechanical means, for example, by physically rotating a "Gobo" mask inside a "Moving Light" projector.

While the invention has been described with respect to a limited number of embodiments, it will be appreciated that many variations, modifications and other applications of the invention may be made.

What is claimed is:

1. An improved video production method of the type in which a plurality of images of an object in a foreground volume are captured successively by a camera and superposed on a virtual background, the improvement comprising the steps of:
   (a) positioning a screen at least partially beyond the object with respect to the camera;
   (b) projecting a first pattern onto said screen, said first pattern featuring a first scale length;
   (c) determining a position and an orientation of the camera using said first pattern; and
   (d) projecting a second pattern onto the screen;
said first and second patterns being projected on the screen together at least for the duration of the capture of one of the images of the object.

2. The method of claim 1, wherein said projection is effected obliquely with respect to said foreground volume.

3. The method of claim 1, wherein said screen is transparent, and wherein said projection is effected from behind said screen with respect to said object.

4. The method of claim 1, wherein said screen has a surface featuring a chroma-key color, and wherein said projection is effected by directing light through a mask.

5. The method of claim 4, wherein said light is substantially white.

6. The method of claim 1, wherein said second pattern features a second scale length different from said first scale length.

7. The method of claim 1, wherein said second pattern is displaced laterally with respect to said first pattern.

8. The method of claim 1, wherein said second pattern is a transformed replica of said first pattern.

9. The method of claim 8 wherein said first pattern is projected during the capture of a first image of the object, and wherein said second pattern is projected during the capture of a second image of the object immediately subsequent to the capture of said first image of the object.

10. The method of claim 8 wherein said second pattern is translated relative to said first pattern.

11. The method of claim 8 wherein said second pattern is dilated relative to said first pattern.

12. The method of claim 8 wherein said second pattern is contracted relative to said first pattern.

13. The method of claim 8 wherein said second pattern is an affine transformation of said first pattern.

14. The method of claim 8 wherein said second pattern is rotated relative to said first pattern.

15. An improved video production method of the type in which a plurality of images of an object in a foreground volume are captured successively by a camera and superposed on a virtual background, the improvement comprising the steps of:
   (a) positioning a screen at least partially beyond the object with respect to the camera;
   (b) projecting a first pattern onto said screen, said first pattern featuring a first scale length;
   (c) determining a position and an orientation of the camera using said first pattern; and
   (d) projecting a second pattern onto the screen, said second pattern being a transformed replica of said first pattern;
wherein said first pattern is projected during the capture of a first image of the object, and wherein said second pattern is projected during the capture of a second image of the object immediately subsequent to the capture of the first image of the object.

16. An improved video production method of the type in which a plurality of images of an object in a foreground volume are captured successively by a camera and superposed on a virtual background, the improvement comprising the steps of:
   (a) positioning a screen at least partially beyond the object with respect to the camera;
   (b) projecting a first pattern onto said screen, said first pattern featuring a first scale length;
   (c) determining a position and an orientation of the camera using said first pattern; and
   (d) projecting a second pattern onto the screen, said second pattern being a dilated replica of said first pattern.

17. An improved video production method of the type in which a plurality of images of an object in a foreground volume are captured successively by a camera and superposed on a virtual background, the improvement comprising the steps of:
   (a) positioning a screen at least partially beyond the object with respect to the camera;
   (b) projecting a first pattern onto said screen, said first pattern featuring a first scale length;

(c) determining a position and an orientation of the camera using said first pattern; and (d) projecting a second pattern onto the screen, said second pattern being a contracted replica of said first pattern.

18. An improved video production method of the type in which a plurality of images of an object in a foreground volume are captured successively by a camera and superposed on a virtual background, the improvement comprising the steps of:

(a) positioning a screen at least partially beyond the object with respect to the camera;

(b) projecting a first pattern onto said screen, said first pattern featuring a first scale length;

(c) determining a position and an orientation of the camera using said first pattern; and (d) projecting a second pattern onto the screen, said second pattern being a rotated replica of said first pattern.

19. An improved video production method of the type in which a plurality of images of an object in a foreground volume are captured successively by a camera and superposed on a virtual background, the improvement comprising the steps of:

(a) positioning a screen at least partially beyond the object with respect to the camera;

(b) projecting a first pattern onto said screen;

(c) determining a first position and a first orientation of the camera using said first pattern;

(d) projecting a second pattern onto the screen; and (e) determining a second position and a second orientation of the camera using said second pattern.

20. An improved video production method of the type in which a plurality of images of an object in a foreground volume are captured successively by a camera and superposed on a virtual background, the improvement comprising the steps of:

(a) positioning a screen at least partially beyond the object with respect to the camera;

(b) projecting a first pattern onto said screen, said first pattern featuring a first scale length;

(c) determining a position and an orientation of the camera using said first pattern; and (d) projecting a second pattern onto the screen, said second pattern having a second scale length different from said first scale length.

21. An improved video production method of the type in which a plurality of images of an object in a foreground volume are captured successively by a camera and superposed on a virtual background, the improvement comprising the steps of:

(a) positioning a screen at least partially beyond the object with respect to the camera;

(b) projecting a first pattern onto said screen;

(c) determining a position and an orientation of the camera using said first pattern; and (d) projecting a second pattern onto the screen, said second pattern displaced laterally with respect to said first pattern.

22. An improved video production method of the type in which a plurality of images of an object in a foreground volume are captured successively by a camera and superposed on a virtual background, the improvement comprising the steps of:

(a) positioning a screen at least partially beyond the object with respect to the camera;

(b) projecting a first pattern onto said screen;

(c) determining a position and an orientation of the camera using said first pattern; and (d) projecting a second pattern onto the screen, said second pattern being a transformed replica of said first pattern.

23. The method of claim 22 wherein said second pattern is translated relative to said first pattern.

24. The method of claim 22 wherein said second pattern is an affine transformation of said first pattern.

25. A method of tracking a camera, comprising the steps of:

(a) projecting a first pattern on a screen;

(b) capturing a first image of at least a first portion of said screen, said first image including at least a portion of said first pattern;

(c) determining a first position and a first orientation of the camera from said first image;

(d) projecting a second pattern on said screen;

(e) capturing a second image of at least a second portion of said screen, said second image including at least a portion of said second pattern; and (f) determining a second position and a second orientation of the camera from said second image.

26. A method of tracking a camera, comprising the steps of:

(a) projecting a first pattern on a screen, said first pattern having a first scale length;

(b) capturing a first image of at least a first portion of said screen, said first image including at least a portion of said first pattern;

(c) determining a first position and a first orientation of the camera from said first image;

(d) projecting a second pattern on said screen, said second pattern having a second scale length different from said first scale length; and (e) capturing a second image of at least a second portion of said screen, said second image including at least a portion of said second pattern.

27. A method of tracking a camera, comprising the steps of:

(a) projecting a first pattern on a screen;

(b) capturing a first image of at least a first portion of said screen, said first image including at least a portion of said first pattern;

(c) determining a first position and a first orientation of the camera from said first image;

(d) projecting a second pattern on said screen, said second pattern being displaced laterally from said first pattern; and (e) capturing a second image of at least a second portion of said screen, said second image including at least a portion of said second pattern.

28. A method of tracking a camera, comprising the steps of:

(a) projecting a first pattern on a screen;

(b) capturing a first image of at least a first portion of said screen, said first image including at least a portion of said first pattern;

(c) determining a first position and a first orientation of the camera from said first image;

(d) projecting a second pattern on said screen; and (e) capturing a second image of at least a second portion of said screen, said second image including at least a portion of said second pattern;

wherein said first and second images are projected together on said screen during said capturing of said second image, and wherein said second image includes at least a portion of said first pattern.

29. A method of tracking a camera, comprising the steps of:

(a) projecting a first pattern on a screen;

(b) capturing a first image of at least a first portion of said screen, said first image including at least a portion of said first pattern;

(c) determining a first position and a first orientation of the camera from said first image;

(d) projecting a second pattern on said screen, said second pattern being a transformed replica of said first pattern; and (e) capturing a second image of at least a second portion of said screen, said second image including at least a portion of said second pattern.

30. The method of claim 29 wherein said capturing of said second image is effected immediately subsequent to said capturing of said first image.

31. The method of claim 29 wherein said second pattern is translated relative to said first pattern.

32. The method of claim 29 wherein said second pattern is dilated relative to said first pattern.

33. The method of claim 29 wherein said second pattern is contracted relative to said first pattern.

34. The method of claim 29 wherein said second pattern is an affine transformation of said first pattern.

35. The method of claim 29 wherein said second pattern is rotated relative to said first pattern.

* * * * *